United States Patent Office 3,170,517
Patented Feb. 23, 1965

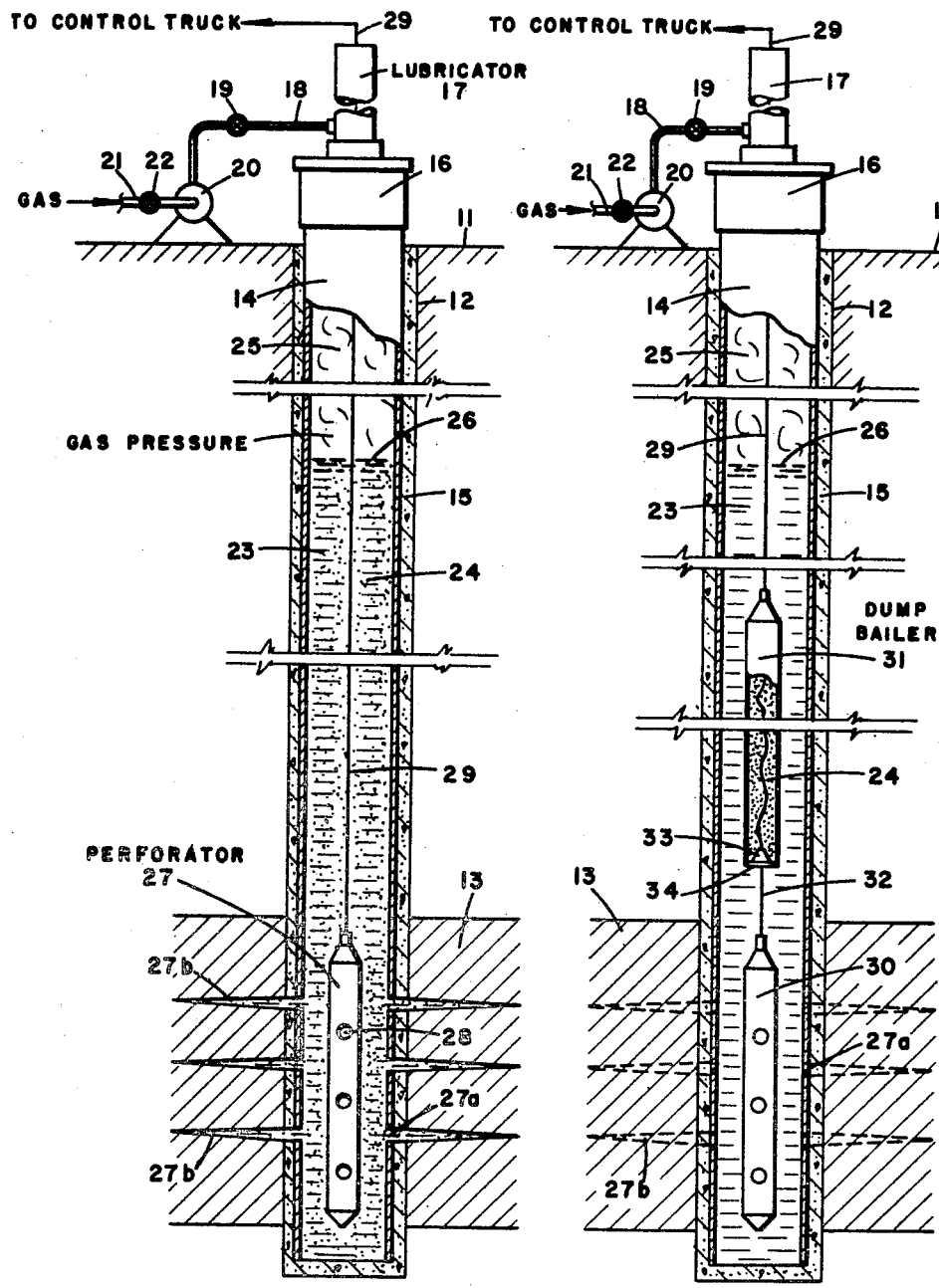

3,170,517
FRACTURING FORMATION AND STIMULATION OF WELLS
John W. Graham, Houston, Tex., and Nils L. Muench, Washington, D.C., assignors, by mesne assignments, to Jersey Production Research Company, Tulsa, Okla., a corporation of Delaware
Filed Nov. 13, 1962, Ser. No. 236,939
14 Claims. (Cl. 166—42)

The present invention is directed to a method of fracturing formations. More particularly, the invention is concerned with fracturing a low permeability subsurface earth formation. In its more specific aspects, the invention is concerned with fracturing formations without using a pump to pump fracturing fluid during the fracturing operation.

The present invention may be briefly described as a method for fracturing a subsurface earth formation penetrated by a well in which a body of fracturing liquid is introduced into the well in a sufficient quantity to flow into the formation and to fill the fractures formed in the formation and to provide for fluid loss into the formation. The well is partially filled with fracturing liquid such that a substantial gas space is provided above the body of fracturing liquid. A gasiform fluid is introduced into the space above the fracturing liquid under a pressure sufficient to cause fracturing of the subsurface earth formation when the casing lining in the well is perforated. The formation is then perforated in the fracturing liquid which is pressurized with the gasiform fluid whereby fracturing of the formation with the fracturing liquid takes place.

In the practice of the present invention it is contemplated that the invention may be conducted in a cased well or in a cased well having a tubing therein.

The fracturing liquid employed in the practice of the present invention may be a low or a high viscosity liquid. Sand or gravel or other materials may be mixed with the fracturing liquid to act as a propping agent to assist in maintaining channels of flow after the fracturing of the formation has taken place.

As a liquid suitable for use in fracturing formations in accordance with our invention may be mentioned oil, water, emulsions, and dilute hydrochloric acid. If acid is used it may react chemically with the formation to enlarge the fissures thereof while it is being injected into the formation or thereafter. Oil is sometimes deemed more preferable as a fracturing liquid since it does not contaminate oil bearing rock as does water, and the viscosity of the oil may be easily controlled by mixing with a suitable soap. When sand or gravel or other materials are mixed with the fracturing liquid, the liquid should have sufficient viscosity to suspend the particles of the sand or gravel or other materials uniformly. While liquids of reasonably high viscosity may be employed, in no event should the viscosity of the liquid be so high that the formation may become clogged after it has been fractured with the fracturing liquid. The fracturing liquid may be a gel and may be described as involving a mixture of heavy metal soaps with hydrocarbons, such as fuel oil, crude oil and lighter fractions of crude petroleum. As pointed out, the fracturing liquid or gel may have added to it, finely divided material, such as sand and the like, to act as a propping agent and to provide, if desired, weight to the fracturing liquid.

The acid fracturing liquid may be a gel acid, such as gels prepared with Napalm and kerosene or crude oil, and, if desired, containing a propping agent such as sand. Other suitable materials which may be employed include the plastic group of organic compounds which have the property of reverting to a non-viscous condition through the action of chemicals which may be added during the preparation of the fracturing liquid or may break automatically with time or with adjustment of temperature and pressure. French Patent No. 987,352, granted April 11, 1951, sets out in detail many fracturing liquids which will fill the requirements as set out above. For example, in the French patent supra it is mentioned that polymers, plasticizers soluble in petroleum or water, such as oxidized resins or bitumen, may be used and also natural or synthetic rubber, as well as the resins such as polyacrylates. Mention is also made in the French patent supra of many heavy metal soaps which may be used in the formation of such gels. It is desirable in the practice of this invention that the fracturing liquid contain the propping agent to maintain the fractures in on open condition after they have been formed.

It is contemplated that other fracturing liquids may be used such as those well known to the art. As examples of the fracturing liquids also suitable in the practice of the present invention are those fracturing liquids disclosed in the Allen et al. Patent 2,935,129.

The perforating operation may be conducted with a bullet gun or with a perforator having a shaped charge perforating means or with a chemical or a mechanical type of perforator. Also, the perforating may be conducted employing a stream of abrasive fluid under hydraulic pressure sufficient to perforate the casing, cement, and the formation.

The gasiform fluid employed in the practice of the present invention may be an inert gas such as nitrogen, helium, carbon dioxide, sulfur hexafluoride, and the like. Gaseous hydrocarbons, such as the natural gas hydrocarbons, and particularly the $C_1$ to $C_3$ hydrocarbons such as methane, ethane, and propane may be used. Gases which do not react with the hydrocarbons in the formation may be used. While examples have been given of the several gases suitable in the practice of the present invention, it is understood that other inert gases than those illustrated may be employed.

The gasiform fluid may be transported to the well in a liquefied condition and then converted into a gas for introduction into the well. It is contemplated that the gasiform fluid may be introduced into the well in a liquefied condition and there allowed to gasify to the required pressure to cause fracturing of the formation.

The present invention may be further illustrated by reference to the drawings, in which:

FIG. 1 is a schematic sectional view of a well in which the invention is practiced;

FIG. 2 is a modification of FIG. 1;

Figure 5:
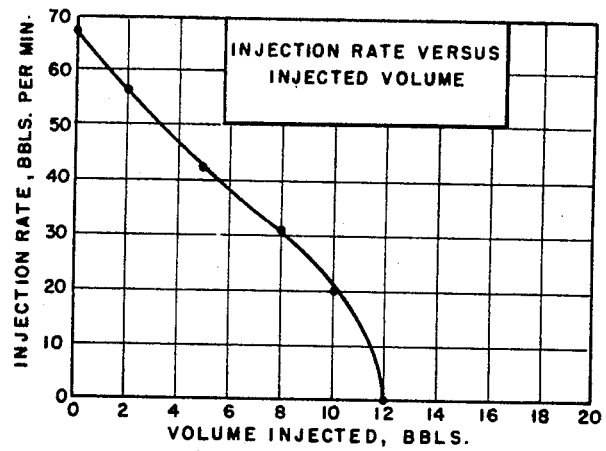
FIG. 5 is a plot of data of injection rate versus injection volume with the present invention.

Referring now to FIG. 1, numeral 11 designates the earth's surface from which a well bore 12 is drilled to penetrate a subsurface productive formation 13 which may contain valuable earth fluids such as liquid or gaseous hydrocarbons, helium, and the like. Suitably, the productive formation 13 contains crude petroleum and/or natural gas.

Arranged in the well bore 12 is a casing 14 which is cemented in place with cement 15. The well casing 14 is suitably closed by a wellhead 16 to which is connected a suitable lubricator 17. Connected to the lubricator 17 is a conduit 18 controlled by valve 19 which connects into compressor or pump 20, into which leads a conduit 21 controlled by valve 22. The conduit 21 connects to a source of gas, not shown.

Arranged in the well casing 14 is a body 23 of a fracturing liquid of the type illustrated. This body 23 may contain a suitable propping agent 24 which may be sand or the like. The body 23 of fracturing liquid is of sufficient quantity to cover the productive formation 13 and to extend in the well casing 14 a distance such as to provide a space 25 extending from the earth's surface 11 to the top 26 of the body 23 a distance in the range from about 10 to about 500 feet. There is lowered through the lubricator 17 a perforating means 27 provided with perforating devices 28, such as shaped charges, bullet guns, and the like, by means of a conductor cable 29 which extends through the lubricator 17 to a gun perforation control truck, not shown. The space 25 may be pressured with high pressure gas at a pressure in the range from about 2000 to about 10,000 pounds per square inch, which is supplied through conduit 21, pump or compressor 20, and conduit 18. The pressure employed may be greater or less than the range given so long as a sufficient pressure is used to fracture the formation. Breakdown pressure of a particular formation may be ascertained and the pressure employed is selected to overcome the overburden pressure of the formation.

Once the body 23 of fracturing liquid is under gas pressure, the perforating means 27 may be operated to form the perforations 27a which pierce the casing and cause the formation, by virtue of the high pressure in the space 25, to cause fractures 27b.

Referring now to FIG. 2 in which identical numerals designate identical parts, a well casing 14, such as in FIG. 1, is provided with a body 23 of fracturing liquid, above which there is a space 25 such as in FIG. 1. In this instance, however, the fracturing liquid 23 is free of sand propping agent.

In this mode and embodiment of the present invention, suspended from the conductor cable 29 in the well casing 14 is a dump bailer 31 which contains the sand propping agent 24. Suspended from the bailer 31 by a conductor cable 32 is a perforating means such as a gun 30 of the type illustrated before.

The dump bailer 31 has an explosive means 33 therein which is designed to cause rupture of the frangible bottom 34. The dump bailer 31, which has been illustrated schematically, is well known in the art and may be a bailer such as represented in the two patents to Toelke—2,956,624 and 2,956,625. While we have illustrated our invention by use of a dump bailer with a bottom which is broken by an explosive, other frangible bottom dump bailers may be used.

In accordance with the mode of operation of FIG. 2, the body of fracturing liquid is arranged as in FIG. 1, and the dump bailer 31 and perforating means 30 are disposed in the body 23 of fracturing liquid with the perforating means 30 adjacent productive formation 13 and the bailer 31, with the sand propping agent 24 therein immediately above or adjacent the perforating means 30. With the body 23 of fracturing liquid under gas pressure, electrical energy may be supplied to the explosive means 33 and to the perforating means 30 through conductors 29 and 32 to cause simultaneous operation of the perforating means 30 and rupturing of the frangible bottom 34 by explosive means 33, releasing the sand propping agent 24 into the body 23 such that the sand propping agent may be forced out into the productive formation 13, through the perforation 27a, and into the fractures 27b, as shown in dotted lines and formed by the effect of the high pressure on the body 23.

It will be clear from the foregoing description taken in conjunction with FIGS. 1 and 2 that a new, useful, and advantageous mode has been provided for fracturing subsurface earth formations which avoids the use of high pressure pumps for pumping fracturing liquids into the formation.

After the formation has been fractured as has been described, the fracturing liquid may be removed from the well and the well brought on to production.

As an example of the practice of the present invention, in a well drilled to 3500 feet, a 5½ inch casing is cemented in place and a body of 20° API oil having a viscosity of 10 centipoises at reservoir temperature which may typically range from about 100° to about 350° F. is arranged to cover a 25-foot completion interval in a hydrocarbon productive zone. The fracturing liquid has 2 pounds of sand per gallon suspended therein as a propping agent. A perforating means, such as a shaped charge perforator designed to provide 2 shots per foot, is arranged adjacent the 25-foot completion interval with the shots designed to provide a perforation of ½ inch in diameter. In this particular instance, the oil may extend to within 331 feet of the earth's surface.

A volume of gas, such as nitrogen, is provided in the space above the body of fracturing liquid such that if the gas were compressed to 4500 pounds per square inch at 20° C., it would occupy 65 cubic feet of space. The perforator is then shot and the gas expands isothermally as a perfect gas. In this particular instance, the overburden pressure is 3500 pounds per square inch, and the breakdown pressure is 3550 pounds per square inch.

Figure 3:
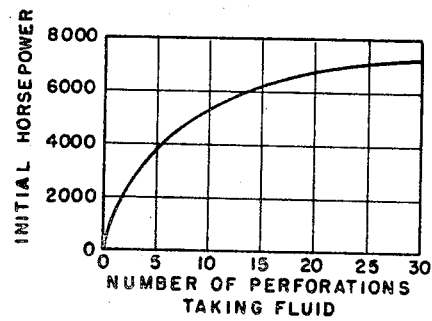
FIG. 3 is a plot of data of horsepower developed in the present invention.

Referring now to FIG. 3 under conditions such as given in this example for this type of well, the initial horsepower exerted against the formation is shown in the curve and plotted against the number of perforations taking fluid from the well casing. FIG. 3 was computed from the equation:

$$H.P. = (P_G \times D \times A)$$

where $P_G$=Gas pressure, lb. per sq. in.
$D$=Distance interface moves, ft.
$A$=Area of the pipe cross-section, sq. ft.

This equation is dimensionally equal to horsepower. This "initial effective horsepower" is thus related to the product of the initial pressure in the gasiform fluid times the rate at which the gas-liquid interface moves downward as the fluid enters the newly formed perforations in the casing. Thus, as shown in FIG. 3, the "initial effective horsepower" for the typical example is given in terms of the number of perforations, and is shown to increase as the number of perforations increase.

The very large values of "initial effective horsepower" (of the order of 6000 H.P. as shown in FIG. 3) represents the central economic and operational advantage of the method. Large horsepower, typically 600 to many thousands H.P. is required for periods of many minutes to fracture formations, and this large horsepower, if provided by conventional pumps, necessary in many cases transported over large distances and difficult terrain, is very costly. In contradistinction, the present method economically achieves very great "effective horsepower" by using a very low horsepower to compress gas over much longer periods of time (of the order of several hours).

Figure 4:
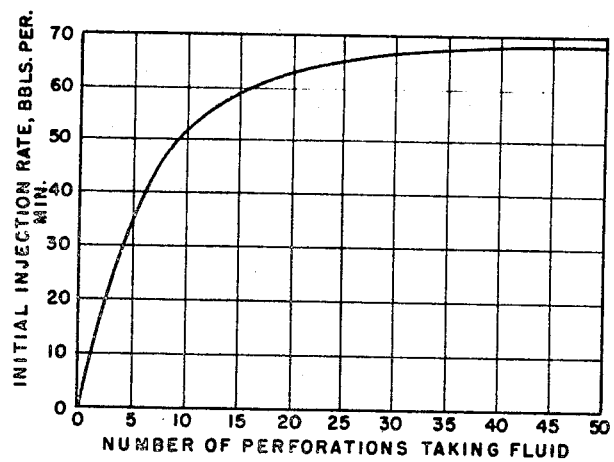
FIG. 4 is a plot of data showing the initial injection rate in accordance with the present invention.

Referring to FIG. 4, a plot of data is given showing the initial injection rate of the fracturing liquid into the formation in barrels per minute plotted against the number of perforations taking fluid under the conditions of the foregoing example.

FIG. 5 shows the injection rate versus the injected volume for the present invention, which illustrates that fracturing is performed since the initial injection rate as shown in FIG. 5 is 67 barrels per minute even after a volume of 10 of the 12 barrels total fluid injected, and an injection rate of 20 barrels per minute is still obtained with 32 perforations. This rate corresponds to a daily volume of 1440×20=28,800 barrels per day. The data also show the injection rate with other volumes.

As a comparison with the conventional fracturing operation using pump pressure to pump fracturing liquid into the formation, a pressure of 3550 pounds per square inch is required, which is arbitrarily selected in this instance as 50 pounds per square inch above the overburden pressure. In the conventional fracturing operation when commercial equipment is used to pump fracturing liquid into the formation of the example, a pressure of 3550 p.s.i. at the depth of the formation is required to initiate a fracture. This requires 1905 p.s.i. pump pressure, at the surface, which means a total of 3120 H.P. is required to inject the fracturing fluid at an initial rate of 67 barrels per minute. As a comparison, in accordance with the present invention, when 4500 p.s.i. nitrogen gas pressure at 20° C. is imposed on the fluid column, a pressure of 6145 p.s.i. is generated at the depth of the formation which is 2645 p.s.i. over the overburden pressure. This pressure, to give an injection rate of 67 barrels per minute, is equal to 4342 H.P. This is done without the use of pumps to pump the fracturing liquid into and to part the formation.

The present invention is quite important and useful in well stimulating operations in that fracturing is usually conducted to increase the productivity of a well that produces from a porous stratum of a low or apparently low permeability. In some instances, the major effect of fracturing is to establish communication between the well bore and a productive formation through a damaged zone of reduced permeability immediately surrounding the well bore. Perforations in a well casing may be completely or partially plugged and formations may be damaged by intrusion of fluids from the well. In short, in accordance with the present invention, formations which have low permeability or which have been damaged to the extent that a low permeability zone around the well bore is present, may be treated to allow the production of hydrocarbons therefrom.

The invention has many advantages. Thus, wide fractures through which hydrocarbons may be conducted are produced. It is unnecessary to use large pumps to pump large volumes of oil into the formation and the cost of fracturing operations is substantially reduced.

The present invention is unobvious over the prior art in that heretofore it was necessary to use pumps to introduce fluid into the well and/or to have a column of liquid extending to the well head. In accordance with the present invention, the use of high pressure pumps to pump fracturing liquid and the provision of a column of fracturing liquid extending to the wellhead are unnecessary. In other words, the high pressure gas space acts as a piston in causing the fracturing liquids below to be forced into the formation. Thus, the amount of fracturing fluid employed may be reduced. Likewise, it is unnecessary to provide expensive high pressure pumps since the fracturing pressure is supplied by the gas.

The nature and objects of the present invention having been completely described and illustrated and the best mode thereof set forth, what we wish to claim as new and useful and secure by Letters Patent is:

1. A method for fracturing a subsurface earth formation penetrated by a well having a casing therein which comprises introducing into said casing a body of fracturing liquid in sufficient quantity to cover at least a portion of said formation and extend in said well a substantial distance from the earth's surface to provide a substantial gas space in said well above said body, introducing a gasiform fluid into said space and building up in said space a pressure sufficient to cause fracturing of said formation with only said fracturing liquid when said casing and said formation are perforated, and then perforating said casing and said formation in said fracturing liquid.

2. A method in accordance with claim 1 in which the casing and formation are perforated by firing a bullet gun.

3. A method in accordance with claim 1 in which the casing and formation are perforated by firing a shaped charge perforator.

4. A method in accordance with claim 1 in which the casing and formation are perforated by directing an abrasive-laden stream under sufficient hydraulic pressure against said casing and formation.

5. A method for fracturing a subsurface earth formation penetrated by a well having a casing therein which comprises introducing into said casing a body of fracturing liquid containing a propping agent in sufficient quantity to cover at least a portion of said formation and extend in said well a substantial distance from the earth's surface to provide a substantial gas space in said well above said body, introducing a gasiform fluid into said space and building up in said space a pressure sufficient to cause fracturing of said formation with only said fracturing liquid when said casing and said formation are perforated, and then perforating said casing and said formation in said fracturing liquid.

6. A method for fracturing a subsurface earth formation penetrated by a well having a casing therein which comprises introducing into said casing a body of fracturing liquid in sufficient quantity to cover at least a portion of said formation and extend in said well a substantial distance within the range from about 10 to about 500 feet from the earth's surface to provide a substantial gas space in said well above said body, introducing a gasiform fluid into said space and building up in said space a pressure sufficient to cause fracturing of said formation with only said fracturing liquid when said casing and said formation are perforated, and then perforating said casing and said formation in said fracturing liquid.

7. A method for fracturing a subsurface earth formation penetrated by a well having a casing therein which comprises introducing into said casing a body of fracturing liquid in sufficient quantity to cover at least a portion of said formation and extend in said well a substantial distance from the earth's surface to provide a substantial gas space in said well above said body, introducing a gasiform fluid into said space and building up in said space a pressure within the range from about 2000 to about 10,000 pounds per square inch sufficient to cause fracturing of said formation with only said fracturing liquid when said casing and said formation are perforated, and then perforating said casing and said formation in said fracturing liquid.

8. A method for fracturing a subsurface earth formation penetrated by a well having a casing therein which comprises introducing into said casing a body of fracturing liquid in sufficient quantity to cover at least a portion of said formation and extend in said well a substantial distance within the range from about 10 to about 500 feet from the earth's surface to provide a substantial gas space in said well above said body, introducing a gasiform fluid into said space and building up in said space a pressure within the range from about 2000 to about 10,000 pounds per square inch sufficient to cause fracturing of said formation with only said fracturing liquid when said casing and said formation are perforated, and then perforating said casing and said formation in said fracturing liquid.

9. A method in accordance with claim 8 in which the gasiform fluid is a hydrocarbon.

10. A method in accordance with claim 8 in which the gasiform fluid is a hydrocarbon having 1 to 3 carbon atoms in the molecule.

11. A method for fracturing a subsurface earth formation penetrated by a well having a casing therein which comprises introducing into said casing a body of fracturing liquid in sufficient quantity to cover at least a portion of said formation and extend in said well a substantial distance from the earth's surface to provide a substantial gas space in said well above said body, introducing nitrogen into said space and building up in said space a pressure sufficient to cause fracturing of said formation with only said fracturing liquid when said casing and said formation are perforated, and then perforating said casing and said formation in said fracturing liquid.

12. A method in accordance with claim 11 in which the nitrogen is introduced into the casing as a liquid.

13. A method for fracturing a subsurface earth formation penetrated by a well lined with a casing which comprises introducing into said cased well a body of fracturing liquid in sufficient quantity to cover at least a portion of said formation and extend in said well casing a substantial distance from the earth's surface to provide a substantial gas space in said well above said body, introducing a gasiform fluid into said space and building up in said space a pressure sufficient to cause fracturing of said formation with only said fracturing liquid when said casing is perforated, perforating said casing in said fracturing liquid, and, simultaneously with perforating said casing, releasing propping agent into said fracturing liquid.

14. A method in accordance with claim 13 in which the propping agent is released from a confined body of same arranged in said fracturing liquid.

References Cited in the file of this patent

UNITED STATES PATENTS

| | | |
|---|---|---|
| 1,843,002 | Small | Jan. 26, 1932 |
| 2,315,496 | Boynton | Apr. 6, 1943 |
| 2,766,828 | Rachford | Oct. 16, 1956 |
| 2,876,843 | Huber | Mar. 10, 1959 |
| 2,988,143 | Scotty | June 13, 1961 |
| 3,004,594 | Crawford | Oct. 17, 1961 |
| 3,011,551 | Young et al. | Dec. 5, 1961 |